Patented Apr. 29, 1941

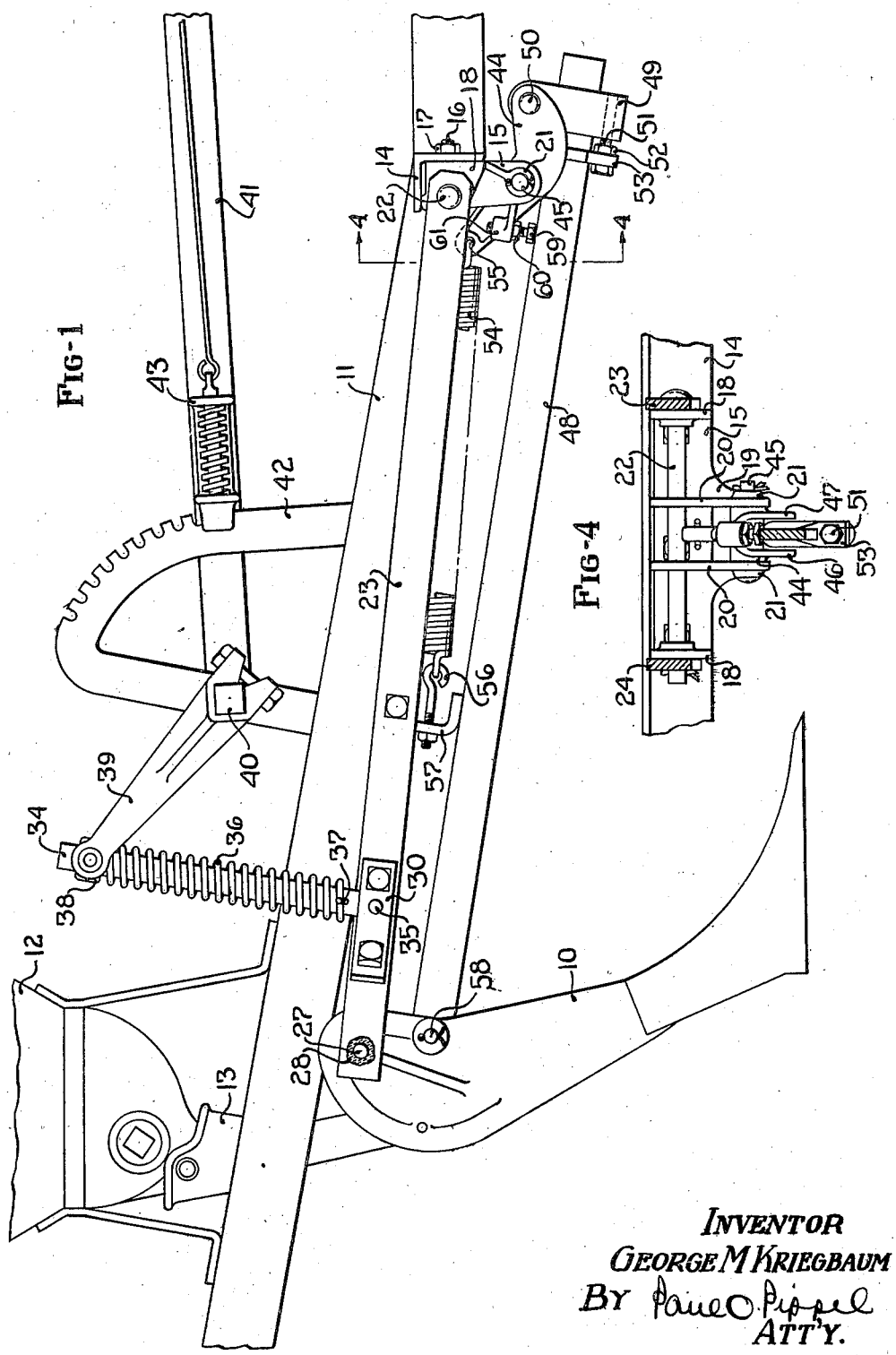

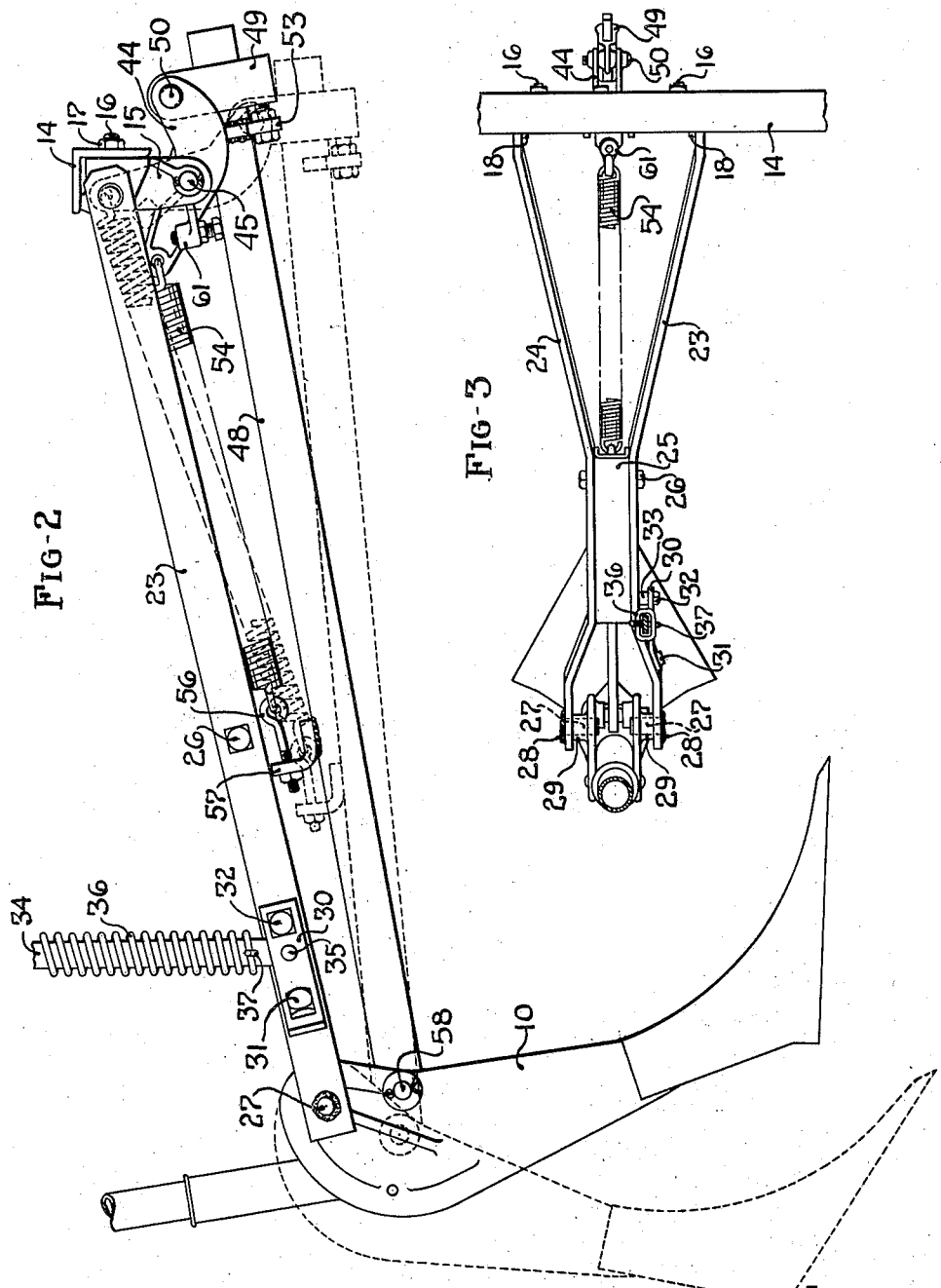

2,239,918

UNITED STATES PATENT OFFICE 2,239,918

PARALLEL LIFT FOR FURROW OPENERS

George M. Kriegbaum, Richmond, Ind., assignor to International Harvester Company, a corporation of New Jersey Application January 31, 1940, Serial No. 316,495

6 Claims. (Cl. 97—184)

This invention relates to a furrow opener. More specifically it relates to a parallel lift for a furrow opener.

An object of the present invention is to provide an improved furrow opener.

A further object is the provision of an improved furrow opener having a parallel lift.

Another object is to provide a release for a furrow opener having a parallel lift.

Still another object is the provision of a parallel lift for a furrow opener which includes a release.

According to the present invention, a connecting linkage, including parallel links, connects a furrow opener with a supporting frame, thereby providing a parallel lift for the furrow opener. The connection of one of the links with the frame is releasable, so that the furrow opener may yield upon striking an obstruction.

In the drawings:

Figure 1 is a side elevation of a portion of a drill having a furrow opener lifted by the parallel links of the present invention;

Figure 2 is a side view of a portion of some of the parts shown in Figure 1, with the furrow opener in ground-engaging position rather than in raised position;

Figure 3 is a plan view of the parts shown in Figure 2; and,

Figure 4 is a sectional view taken on the line 4—4 of Figure 1.

Figure 1 shows parts of a drill which include a furrow opener 10, a supporting framework 11, a seed box 12, and a seed tube 13 leading from the seed box to the furrow opener. The supporting framework 11 includes as a part thereof a transversely extending angle member 14 to which is attached a bracket 15 by bolts 16 and nuts 17. The bracket 15 has ears 18 at its extremities, a depending portion 19, and ears 20, positioned in spaced relation centrally of the bracket and having at their lower ends bearing portions 21 connected with the depending portion 19.

A pin 22 pivotally connects a pair of links 23 and 24 to the ears 18. As seen in Figure 3, these links 23 and 24 converge toward one another and are secured together at a central portion by means of an inverted channel member 25 and a bolt 26 passing through the links in the channel member. The links 23 and 24 are pivotally connected to the furrow opener at their ends by means of pins 27 secured, as by welding, at 28 to the ends of the links. The pins 28 are journaled in openings in bearing portions 29 in the furrow opener 10. A strap 30 is secured in spaced relation to the link 23 by means of a bolt 31, bolt 32, and sleeve 33. The end of a member 34 fits in the space between the strap 30 and the link 23 and is pivotally secured to the strap and the link by means of a pin 35. A coil spring 36 surrounds the member 34 and has its lower end secured to the member by means of a W-shaped pin 37. A trunnion member 38 is secured to the upper end of the spring and is pivotally connected with an arm 39 secured to a shaft 40 formed as part of a lever arm 41 and pivoted on an arcuate toothed member 42. A pin 38' extending through the upper end of the member 34 limits the upward movement of the trunnion member 38. The lever arm 41 has a detent mechanism 43 which permits the arm 41 to be set in a number of angular positions, the detent mechanism engaging the teeth of the arcuate member 42.

A lever 44 fits between the ears 20 of the bracket 15, and a pin 45 pivotally connects the lever to the bracket. The lever 44 has spaced portions 46 and 47, between which a link 48 and a member 49 extend. The member 49 is pivotally connected to one extremity of the lever 44 by means of a pin 50. A bolt 51 is threaded into the member 49 and is secured by means of a nut 52 to a clip 53 secured to the under side of the link 48. A spring 54 has one end secured in an opening 55 in an end of the lever 44 and the other end secured by means of an eye bolt 56 to a clip 57 secured to the upper side of a midpoint of the link 48. One end of the link 48 extends into the furrow opener 10 and is pivotally secured thereto by means of a pin 58. A bolt 59 is adjustably secured by a nut 60 to a portion 61 of the lever 44 into which the bolt 59 is threaded.

It will be observed that the links 23 and 24 constitute in effect one link, since they are secured to one another. These two links, acting as one, and the link 48 constitute in effect a parallel lift for the furrow opener 10. Figure 2 shows the furrow opener in its lowered or ground-engaging position. Figure 1 shows the furrow opener in raised or transport position. The raising of the opener is accomplished by angular movement of the lever arm 41, which acts through the arm 39, collar 38, pin 38', and member 34 to exert a pull upon the links 23 and 24 and thereby to raise the furrow opener 10. During this raising the lever arm 48 pivots about the pin 45 which supports the lever 44 in the bracket 15. This is true because the spring 54 causes the link 48 to abut the head of the bolt 59 and thereby to make the lever 44 and link 48 move as one. When an obstruction is encountered, a force is exerted on the lower end of the furrow opener much greater than the usual pull of the ground on the opener. When the force is sufficient, the furrow opener is moved from the full line position to the dotted line position of Figure 2 and thereby causes a lengthwise movement of the link 48, which is permitted by a relative angular movement of the lever 44 with respect to the link 48, as shown in the change of position of these parts from full line position to dotted line position. By means of adjustment of the bolt 51, the lengthwise position of the link 48 may be adjusted with respect to the lever 44, and thereby the angle of the furrow opener 10 is changed.

It will be seen from the foregoing description that a new and novel furrow opener construction has been provided by which the furrow opener is connected to a supporting framework by means of parallel links, and the connection of one of the links is releasable, so that a tripping may take place when the furrow opener encounters an obstruction. The intention is to limit the invention only within the terms of the appended claims.

What is claimed is:

1. In combination, a furrow opener, a first link having one end pivotally connected to the furrow opener, a second link generally parallel to the first link and having one end pivotally connected to the furrow opener at a point spaced from the connection of the furrow opener and the first link, a support pivotally connected to the end of the first link opposite the end connected to the furrow opener, a lever pivotally connected at a mid-point to the support and at one end to the end of the second link opposite the end to which the furrow opener is connected, and a spring connecting the other end of the lever and an intermediate point of the second link.

2. In combination, an implement, a support, a first link pivotally connected at one end to the support and at the other end to the implement, a second link pivotally connected at one end to the implement at a point spaced from the connection of the first link and the implement, a lever pivotally mounted at a mid-point to a point on the support spaced from the connection of the first link and the support, and having one arm pivotally connected to the end of the second link opposite the end connected to the implement and a portion of the other arm abutting the second link, and means yieldingly urging the said part of the lever arm against the link, whereby the implement has a substantially parallel movement between a ground-engaging position and a transport position, and the striking of an obstruction by the implement causes an angular movement of the lever away from the second link and a lengthwise movement of the second link such as to cause the implement to yield.

3. In combination, an implement, a support, a first link connecting the implement and the support, a second link positioned in generally parallel spaced relation to the first link and connected to the implement at a point spaced from the connection of the implement and the first link, a third link connected to the support at a point spaced from the connection of the first link and the support and extending along the second link to a point of connection with the second link spaced a greater distance from the connection of the second link with the implement than the connection of the third link and the support is spaced, and resilient means resisting angular movement of the second link with respect to the third link.

4. In combination, an implement, a support, a first link connecting the implement and the support, a second link positioned in generally parallel spaced relation and connected to the implement at a point spaced from the connection of the implement and the first link, a lever connected at a mid-point to the support at a point spaced from the connection of the first link and the support and having one arm extending along the second link to a point of connection therewith spaced a greater distance from the connection of the second link with the implement than connection of the lever and the support is spaced, and a spring connecting the other arm of the lever and an intermediate point of the second link.

5. In combination, a furrow opener, a support, a pair of parallel links embracing the furrow opener, means pivotally connecting the links to the furrow opener on the same axis, means pivotally connecting the links to the support on an axis parallel to the said same axis, a third link extending into the furrow opener, means pivotally connecting the third link to the furrow opener on an axis spaced from the axis on which the pair of links are pivotally connected to the furrow opener, a lever pivotally connected at a mid-point to the support on an axis spaced from the pivot axis of the pair of levers on the support and having two arms and being formed of spaced portions, the third link extending between the spaced portions and being pivotally connected to one arm on an axis parallel to the aforementioned pivot axes and spaced from the pivot axis of the third link on the furrow opener a greater distance than the pivot axes of the levers on the support is spaced from the pivot axis of the third link on the furrow opener, and resilient means connecting the other arm of the lever and a mid-point of the third link for holding the third link in contact with the lever.

6. In combination, an implement, a support, a first link connecting the implement and the support, a second link positioned in generally parallel spaced relation to the first link and connected to the implement at a point spaced from the connection of the implement and the first link, a third link connecting the second link and the support, and resilient means resisting angular movement of the second link with respect to the third link.

GEORGE M. KRIEGBAUM.